United States Patent

Ruiz

[11] Patent Number: 5,617,274
[45] Date of Patent: Apr. 1, 1997

[54] LOW PROFILE INTEGRAL FLEXURE FOR CLOSELY PACKED DISKS IN A DISK DRIVE ASSEMBLY

[75] Inventor: Oscar J. Ruiz, San Jose, Calif.

[73] Assignee: International Business Machines Corporation, Armonk, N.Y.

[21] Appl. No.: 585,983

[22] Filed: Jan. 12, 1996

[51] Int. Cl.$^6$ ...................................................... G11B 5/60
[52] U.S. Cl. .......................................................... 360/104
[58] Field of Search .............................. 360/97.01, 98.01, 360/104–106

[56] References Cited

U.S. PATENT DOCUMENTS

| | | | |
|---|---|---|---|
| 4,761,699 | 8/1988 | Ainslie et al. | 360/103 |
| 4,797,763 | 1/1989 | Levy et al. | 360/104 |
| 4,996,623 | 2/1991 | Erpelding et al. | 360/104 |
| 5,115,363 | 5/1992 | Khan et al. | 360/104 |
| 5,138,507 | 8/1992 | Zarouri et al. | 360/104 |
| 5,187,625 | 2/1993 | Blaeser et al. | 360/104 |
| 5,198,945 | 3/1993 | Blaeser et al. | 360/104 |
| 5,225,950 | 7/1993 | Crane | 360/104 |
| 5,282,102 | 1/1994 | Christianson | 360/104 |
| 5,282,103 | 1/1994 | Hatch et al. | 360/104 |
| 5,331,489 | 7/1994 | Johnson et al. | 360/104 |
| 5,333,085 | 7/1994 | Prentice et al. | 360/104 |
| 5,377,064 | 12/1994 | Yaginuma et al. | 360/104 |
| 5,381,288 | 1/1995 | Karam, II | 360/104 |
| 5,428,489 | 6/1995 | Takamure et al. | 360/104 |
| 5,428,490 | 6/1995 | Hagen | 360/104 |
| 5,452,158 | 9/1995 | Harrison et al. | 360/104 |
| 5,491,597 | 2/1996 | Bennin et al. | 360/104 |
| 5,504,640 | 4/1996 | Hagen | 360/104 |
| 5,530,605 | 6/1996 | Hamaguchi et al. | 360/104 |
| 5,530,606 | 6/1996 | Baasch et al. | 360/104 |

FOREIGN PATENT DOCUMENTS

| | | |
|---|---|---|
| 0487914A2 | 6/1992 | European Pat. Off. . |
| 59-207065 | 11/1984 | Japan . |
| 5-36035 | 2/1993 | Japan ................ 360/104 |
| 5-314630 | 11/1993 | Japan ................ 360/104 |
| WO94/12974 | 6/1994 | WIPO . |
| WO94/16438 | 7/1994 | WIPO . |
| WO94/24664 | 10/1994 | WIPO . |

OTHER PUBLICATIONS

"Type 1650 Product Summary", Hutchinson Technology Inc., Sep. 1992, pp. 1–9.

Primary Examiner—Robert S. Tupper
Assistant Examiner—Jefferson Evans
Attorney, Agent, or Firm—Baker, Maxham, Jester & Meador

[57] ABSTRACT

A load beam having an integral flexure for coupling a transducer head in a disk drive assembly. The integral flexure includes a pair of bending bars connected to the main body of the load beam, a floating pad connected to the bending bars, and a dimple formed on the floating pad. A torsion bar connects the floating pad with a bonding pad. The transducer head is adhesively coupled to the bonding pad, and rests upon the dimple. In operation, the dimple provides preload and allows gimbaling along the pitch and roll axis, but yaw movement is substantially prevented by the geometry of the load beam design. The integral flexure has a low profile and will fit within a very small space between closely-spaced disks in a stacked multiple disk drive system.

22 Claims, 8 Drawing Sheets

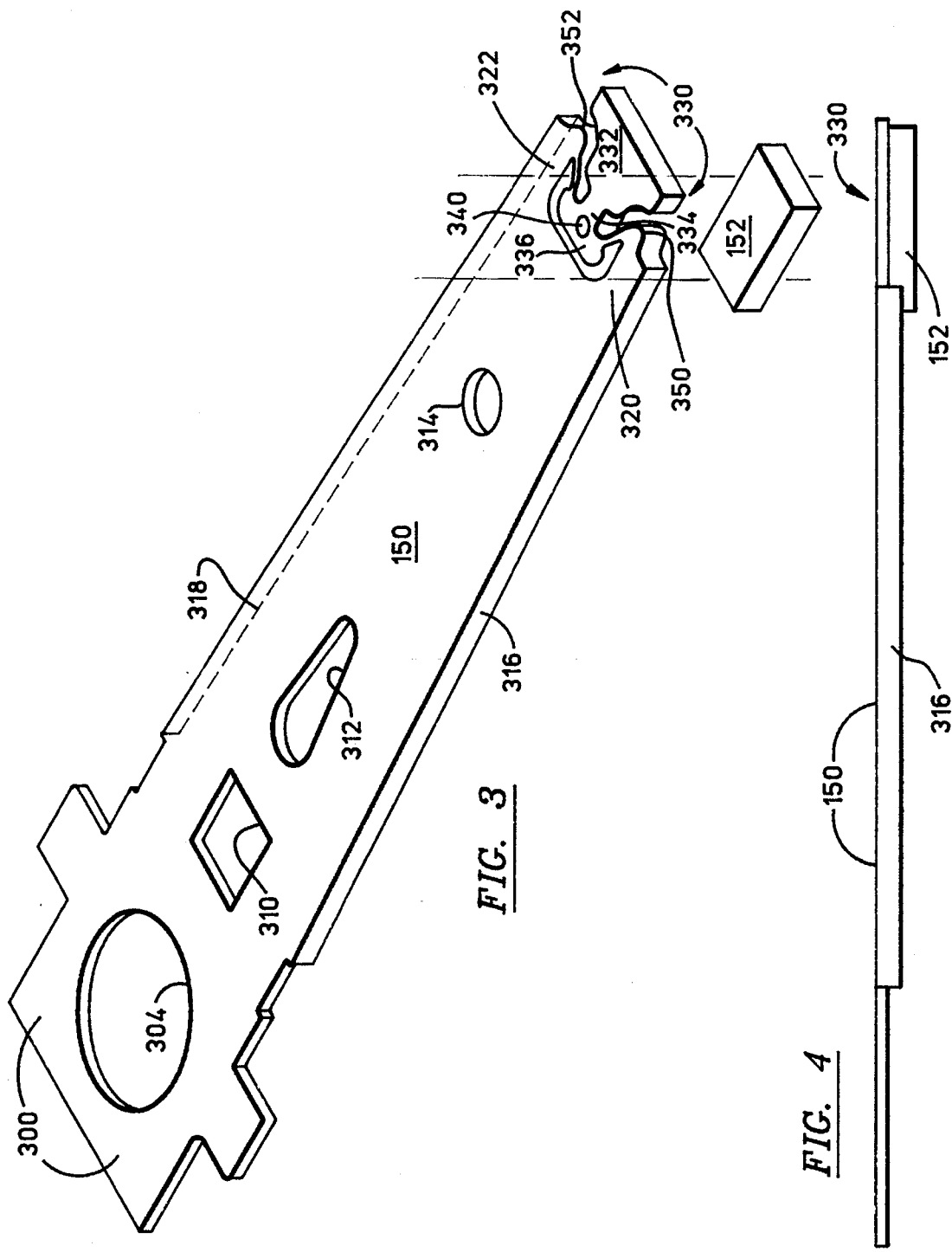

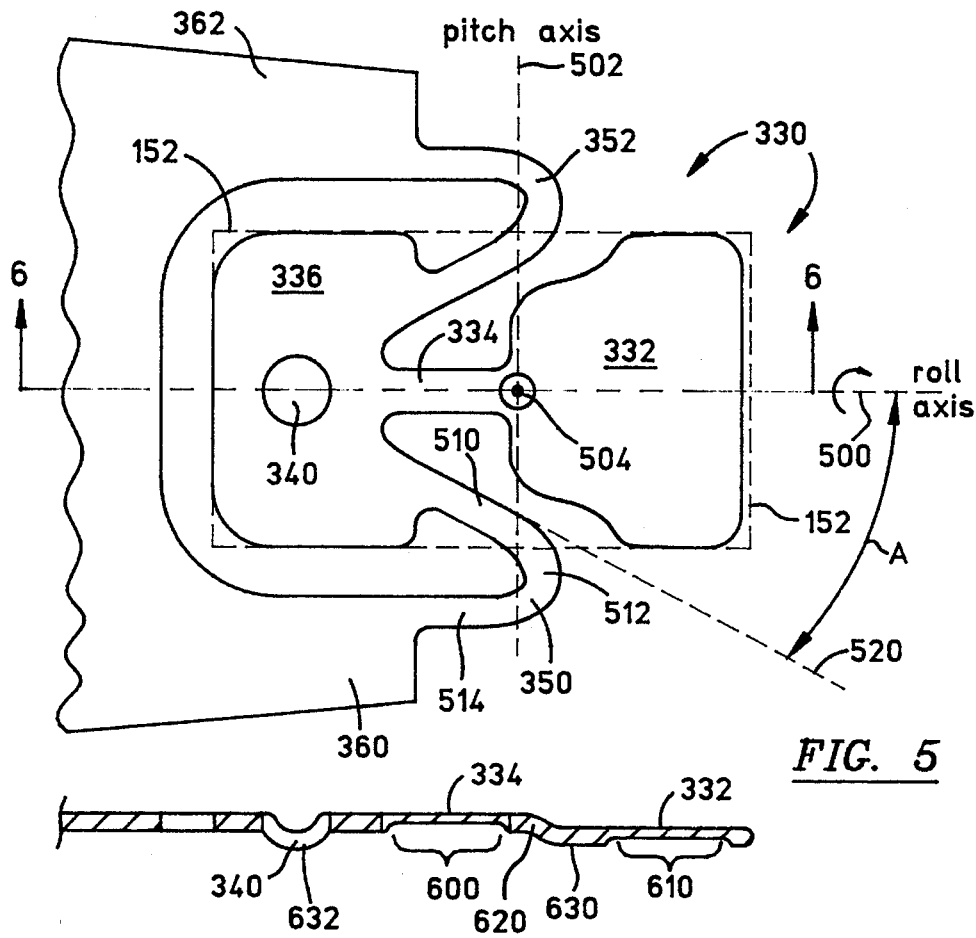
*FIG. 5*
*FIG. 6*
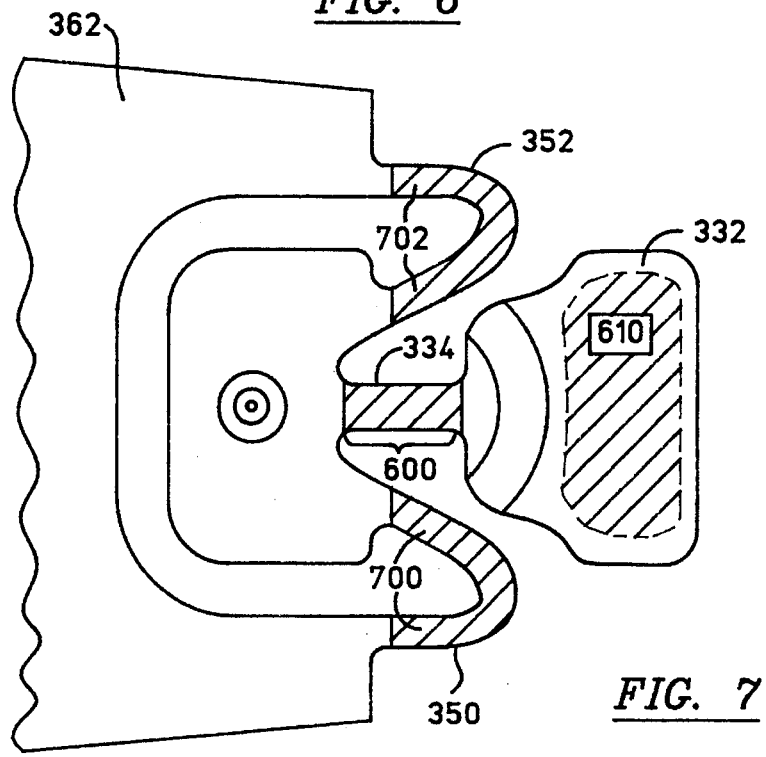
*FIG. 7*

LOW PROFILE INTEGRAL FLEXURE FOR CLOSELY PACKED DISKS IN A DISK DRIVE ASSEMBLY

BACKGROUND OF THE INVENTION

1. Field of the Invention

This invention relates generally to transducer suspension systems for magnetic recording media, and more particularly to low-profile flexures that connect a transducer head with a load beam.

2. Description of the Related Art

Direct access storage devices (DASDs) such as disk drives store information on concentric tracks of a rotatable magnetic recording disk. In order to read or record the desired information on a rotating disk, a magnetic head or other transducer element on a suspension arm is moved from track to track by a rotary or linear actuator. The suspension arm is part of a head suspension assembly that typically includes a load beam attached to an actuator arm, a flexible member (known as a flexure) connected to the load beam, and a transducer head attached to the flexure. The magnetic heads, which actually read or write data on the disk, are positioned within an air-bearing slider. While the disk rotates, the slider "flies" slightly above the surface of the rotating disk, the load beam supports the slider, and the flexure allows it to gimbal to adjust its orientation for unavoidable disk surface run out or flatness variations.

Examples of suspension systems are shown in the following references: U.S. Pat. No. 5,377,064 to Yaginuma et al., issued Dec. 27, 1994; U.S. Pat. No. 5,282,102 to Christianson, issued Jan. 25, 1994; U.S. Pat. No. 5,225,950 to Crane, issued Jul. 6, 1993; U.S. Pat. No. 5,198,945 to Blaeser et al., issued Mar. 30, 1993; U.S. Pat. No. 5,187,625 to Blaeser et al., issued Feb. 16, 1993; U.S. Pat. No. 5,115,363 to Khan et al., issued May 19, 1992; U.S. Pat. No. 4,996,623 to Erpelding et al., issued Feb. 26, 1991; U.S. Pat. No. 4,797,763 to Levy et al., issued Jan. 10, 1989; U.S. Pat. No. 4,761,699 to Ainslie et al., issued Aug. 2, 1988. European Patent Application Publication No. 0487914A2 to Foote et al., published Jun. 03, 1992; PCT Publication No. WO94/24664 for Jurgenson, published Oct. 27, 1994; PCT Publication No. WO 94/16438 for Budde, published Jul. 21, 1994; PCT Publication No. WO 94/12974 for Budde, published Jun. 9, 1994 and Japanese Patent Publication No. 59-207065 for Hashimoto, published Nov. 24, 1984.

A flexure must provide a proper pivotal connection for the slider so that during operation, the slider can compensate for irregularities in manufacture and operation by pitching and/or rolling slightly in order to maintain the air bearing while maintaining appropriate stiffness against yaw movement. Pitch is defined as rotation about an axis extending directly out from the actuator arm in the plane of the disk, and roll is defined as rotation about an axis perpendicular to the pitch axis but still lying in the plane of the disk. Yaw is gyration around an axis perpendicular to the air-bearing surface. In order to be useful, any flexure must achieve low enough pitch and roll stiffness for the air bearing flying height tolerances while at the same time achieving high enough yaw stiffness.

In some suspension assemblies, the flexure is integral with the load beam; i.e., it is formed from the same sheet of metal. In other suspension assemblies, the flexure is manufactured separately and then affixed to a load beam.

Two-part load beams include a dimple to provide preload between the flexure and the main body of the load beam. For example U.S. Pat. No. 5,377,064 discloses a flexure in FIG. 12 that has a bonding pad including an upwardly facing dimple formed therein. The dimple is designed to be pushed against a portion of the load beam, thereby preloading the transducer head. Two-piece load beams with a dimple can advantageously supply substantial preload because the dimple is very stiff. However, two-piece load beams have disadvantages including increased cost of manufacturing. Particularly, the two pieces each must be separately tracked in inventory control, additional tooling is required to handle each part, and each part must be inspected. Furthermore, additional steps are necessary to manufacture a two-piece load beam and flexure, and there is an increase in the number of rejected parts. Integral flexures can solve many of these problems.

One example of an integral flexure is disclosed in U.S. Pat. No. 5,282,102 to Christianson, which shows two separate bonding pads connected by a torsion bar. The transducer head is connected to both bonding pads. The bonding pad torsion bar is connected to a load beam torsion bar that extends across an opening on the tip of the load beam. As shown, for example in FIG. 7B of U.S. Pat. No. 5,282,102, the bonding pad and torsion bar assembly stamped to allow clearance for pitching and rolling of the transducer head. Integral flexures have advantages of simplicity and a low cost of manufacture because they can be formed by an etching process at little additional cost. One disadvantage is that preloading the transducer head is usually accomplished by stamping (deforming the metal by pressure), a process that is difficult to control precisely.

One drawback of conventional integral flexures such as disclosed above is that, because the slider preload is delivered by a thin partially etched feature acting in bending alone or in combination with in-plane forces, preload forces have been limited to small values. If preload were to be increased in these conventional flexures, the flexure would be either over-stressed or deflected beyond acceptable values, causing undesirable interference between the flexure and the slider. In a conventional integral flexure, stiffness is directly related to its thickness, but stress relates to the square of thickness and deflection relates to its to the cube. In general, this means that stress and, in particular, deflection, will often dominate the behavior of the flexure.

Large capacity disk drives typically have multiple disks mounted on the same rotating spindle. The multiple disk configuration advantageously provides greater storage within the fixed size constraints imposed by industry standards such as the form factor package. Disk-to-disk spacing in a range from 2.4 mm to 4.0 mm is near the limits of current technology and imposes a limit upon the number of disks that can fit in a form factor package. In order to accommodate even more disks within the same height, it would be advantageous to reduce the disk-to-disk spacing even further.

To provide closer disk-to-disk spacing it is important that a suspension system has a very low profile. In very small disk-to-disk spacing environments, the solid height of the HGA ("Head Gimbal Assembly") must be small enough to fit within the spacing between disks. The solid height of the HGA is defined as the distance from the slider's air bearing surface to the most distant HGA feature above the slider. For example, in a conventional two-piece suspension that has a dimple to provide preload, the suspension profile includes the flexure bond pad thickness, the dimple height, the load beam thickness and the thickness of the load beam stiffeners-or flanges-if they are oriented upwardly (away from the slider). Of course, if the flanges are oriented downwardly, then they do not contribute to the suspension profile. The solid height can be reduced by choosing the thinnest possible slider and routing the signal wires on the suspension side, instead of above it. Solid height can be reduced further by improving the profile of the suspension.

It would be an advantage to provide a load beam with an integral flexure that can provide substantial preload to allow pitching and rolling movements while substantially preventing yaw movement. It would be a further advantage if the integral flexure had a very low profile to be used in close disk-to-disk spacing applications.

SUMMARY OF THE INVENTION

In accordance with the objectives of this invention as described above and to overcome the limitations of the prior art, a suspension is provided that will fit between closely-spaced disks in a disk drive system having multiple stacked disks. For example, a suspension assembly having the integral flexure described herein will fit within a 1.4 mm space between disks, with a merge clearance of 0.2 mm for each suspension. Furthermore, a preload range up to six grams or more can be obtained. The low profile suspension described herein combines the high preload advantage of the stamped dimple with the low cost advantage of the integral flexure. The yaw stiffness and in-plane strength are also greatly improved.

In order to provide these advantages, a load beam for a head suspension assembly in a disk drive system is provided. The load beam has an integral flexure for coupling to a transducer head, and a main body for coupling to an actuator arm. The main body of the load beam has a first elongated member and a second elongated member. A pair of bending bars are provided in the integral flexure, including a first bending bar coupled to the first elongated member and a second bending bar coupled to the second elongated member. The integral flexure includes a floating pad connected to the pair of bending bars. A dimple is formed in said floating pad, extending in a downward direction. A torsion bar is connected on its first side to the floating pad and on its second side to a bonding pad. The bonding pad has a lower surface for connecting to a transducer head. Preferably, the torsion bar and the bending bars are formed having a partial thickness by, for example, partial etching. Also preferably, the bending bars have a U-shape. A transducer head is connected to the bonding pad, and is allowed to rest against the dimple. In operation, the torsion bar twists to allow the transducer head to roll, while the bending bars allow pitching motion. Yaw movement is minimized due to the resulting high yaw stiffness of the structure.

The foregoing, together with other objects, features and advantages of this invention, will become more apparent when referring to the following specification, claims and the accompanying drawings.

BRIEF DESCRIPTION OF THE PREFERRED EMBODIMENTS

For a more complete understanding of this invention, reference is now made to the following detailed description of the embodiments as illustrated in the accompanying drawing, wherein:

FIG. 3 is a perspective view of a load beam having an integral flexure, also showing a transducer head to be coupled thereto;

FIG. 4 is a side perspective view of the load beam of FIG. 3, illustrating the support flange formed thereon;

FIG. 5 is a top plan view of a preferred embodiment of an integral flexure;

FIG. 6 is a cross-section of the center line of the integral flexure of FIG. 5;

FIG. 7 is a bottom plan view of the integral flexure of FIGS. 5 and 6, illustrating partially etched areas;

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
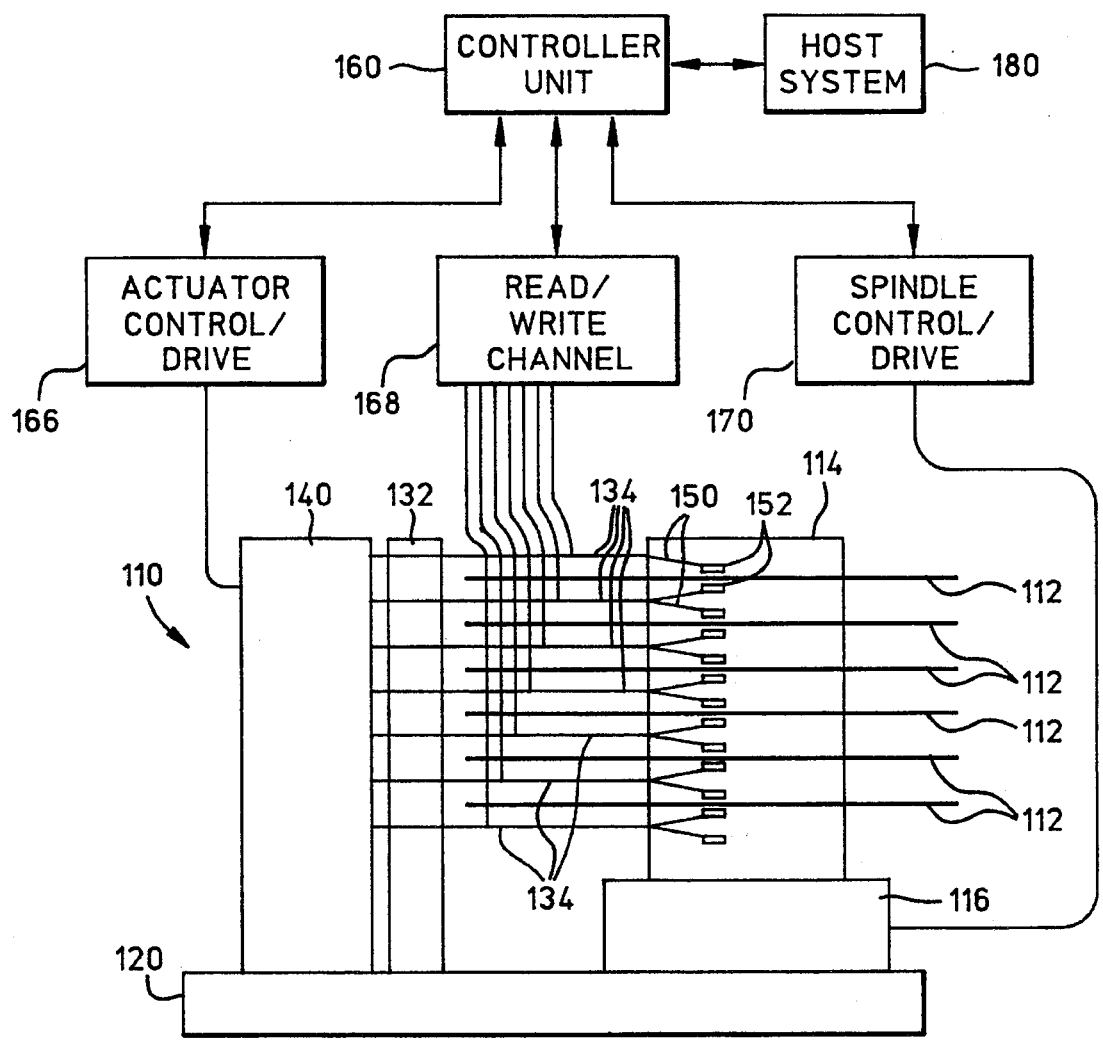
FIG. 1 is a side view of a disk drive system and a controller unit in block form.
Figure 2:
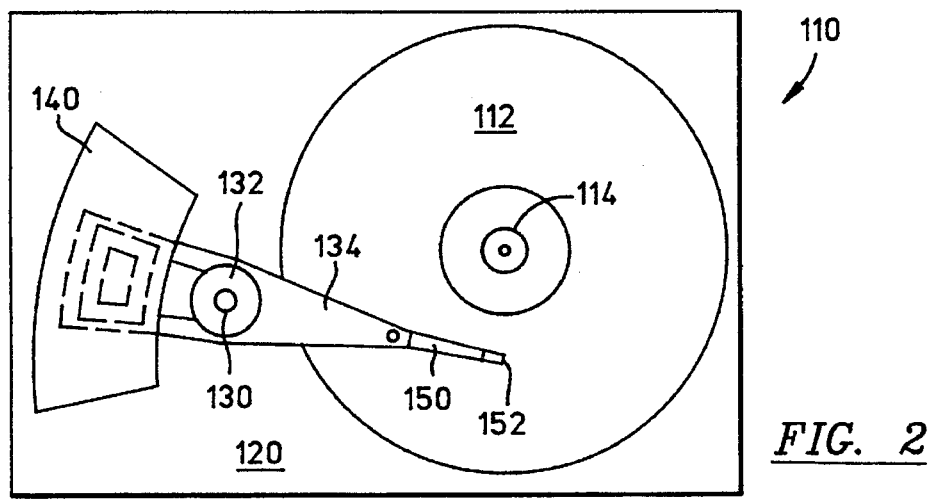
FIG. 2 is a top view of a disk drive system.

FIGS. 1 and 2 show a side and a top view, respectively, of a disk drive system designated by the general reference number 110. The disk drive system 110 comprises a plurality of stacked magnetic recording disks 112 mounted to a spindle 114. The disks 112 may be conventional particulate or thin film recording disks or, in other embodiments, they may be recently proposed liquid bearing disks. The spindle 114 is attached to a spindle motor 116 which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. The stack of actuator arms 134 is sometimes referred to as a "comb". A rotary voice coil motor 140 is attached to chassis 120 and to a rear portion of the actuator arms 134.

A plurality of head suspension assemblies 150 are attached to the actuator arms 134. A plurality of transducer heads 152 are attached respectively to the suspension assemblies 150. The heads 152 are located proximate to the disks 112 so that, during operation, they are in electromagnetic communication with the disks 112 for reading and writing. The rotary voice coil motor 140 rotates actuator arms 134 about the actuator shaft 130 in order to move the head suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that these aspects could also be enabled as hardware logic by one skilled in the computer arts. Controller unit 160 is connected to an actuator control/drive unit 166 which in turn is connected to the rotary voice coil motor 140. This configuration allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in *The Magnetic Recording Handbook*, C. Dennis Mee and Eric D. Daniel, McGraw-Hill Book Company, 1990.

Reference is now made to FIG. 3 which is a perspective view of a load beam 150 for one embodiment. The load beam comprises a generally flat planar structure that has numerous features formed thereon by for example, etching. On one end, the load beam 150 comprises a base section 300 including an opening 304 for connection to the actuator arms 134 (FIGS. 1 and 2) by any suitable means. For example, a mounting plate (not shown) may be positioned opposite an actuator arm 134 and the base section 300 in order to provide a good support for connecting the load beam 150 to the arm 134. The mounting plate is preferably made of a rigid material such as stainless steel, and attaches to the arm by a swage connection through opening 304 and into an opening in the arm 134 or an equivalent attachment. The support plate and the load beam 150 may be attached together by a plurality of welds. The load beam 150 also includes a plurality of holes 310, 312 and 314 formed into the load beam for purposes including tooling, positioning, and controlling the flexure location relative to the load beam.

Flanges 316 and 318 are provided for stiffening the load beam, one along each side of the length of the load beam. Particularly, a first flange 316 is formed along a first side extending from the base section 300, and a second flange 318 is formed extending along a second side from the base section 300. FIG. 4 is a side perspective view of the load beam 150, illustrating the first flange 316. The flanges 316 and 318 may be conventionally manufactured by, for example, stamping.

The first side and the second side of the load beam 150 converge toward a tip that has a first elongated structural member 320 on the first side, and a second elongated member 322 on the second side. The extended members 320 and 322 are connected to a flexure 330 that is integral in construction with the load beam 150. In other words, the flexure in the load beam is formed of a single sheet of metal utilizing an etching process. Preferably, the flexure's features, including the partially-etched features, are etched in the same step with the other etched features on the load beam.

With reference to FIG. 3, the integral flexure 330 includes a bonding pad 332 having a lower surface for coupling to the transducer head 152. A torsion bar 334 connects the bonding pad 332 with a floating pad 336 that includes a downwardly-extending dimple 340. A pair of bending bars 350 and 352 are formed between the floating pad 336 and the main body of the load beam 150. Particularly, a first bending bar 350 is connected to the first- extended member 320 on the first side of load beam 150, and a second bending bar 352 is connected to the second extended member 322 on the second side. The integral flexure 330 is described in more detail subsequently with reference to FIGS. 5–7. Alternative embodiments of the integral flexure 330 are described in subsequent figures.

FIGS. 5, 6, and 7 show various views of the preferred embodiment of the integral flexure 330 shown in FIG. 3. Particularly, FIG. 5 is a top plan view, FIG. 6 is a cross-section along the center of the integral flexure 330, and FIG. 7 is a bottom plan view.

In FIG. 5, a transducer head 152 is shown in dotted lines where it is positioned on the integral flexure 330. Particularly, the transducer head 152 is bonded to the bonding pad 332 on its lower surface by a suitable means, such as an adhesive. The transducer head 152 rests also on the bottommost point of the dimple 340. The transducer head is allowed to roll and pitch as will be described. FIG. 5 shows the orientations for the pitch, roll, and yaw axes. Roll is defined by a roll axis 500 which extends approximately through the center line of the load beam and the center line of the transducer head. As illustrated, the roll axis 500 is aligned with the torsion bar 334 which twists to allow rolling movement. A pitch axis 502 is defined perpendicular to the roll axis but still in the middle plane of the flexure. A yaw axis 504 is defined extending directly out of the page. As can be seen in FIG. 5, the roll axis 500 is approximately aligned with the torsion bar 334.

In operation, the transducer head 152 has freedom to move about the roll axis 500 by rolling upon the dimple 340. Furthermore, pitch movement is allowed along the pitch axis 502 due to flexing of the first and second bending arms 350 and 352. The U-shaped bending arms 350 and 352 are positioned approximately in the center of the transducer head. Advantageously, movement about the yaw axis 504 is limited by the geometry of the design. Particularly, it is believed that the shape of the torsion bar 334 and the U-shape of the bending bars 352 operate together to substantially restrict yaw movement.

The U-shaped bending bars 350 and 352 comprise an approximately straight section 510 extending from the floating pad 336, a curved section 512 defining the bottom of the U-shape, and a second straight section 514 extending from the U-shape's bottom 512 to the first elongated member 360. An angle A is defined between the center line (conveniently the roll axis 500) and a line 520 extending parallel with the straight section 510 of the bending arm 350. In any given design, this angle A can be adjusted to optimize yaw and tangential stiffness. Of course, any adjustments to this angle will also be made to the second bending bar 352, in accordance with the symmetry of the design about the center line.

The cross-section of FIG. 6 and the bottom plan view of FIG. 7 illustrate several features formed by partially etching selected areas so that only a portion of the original thickness remains. Particularly the torsion bar 334 includes a partially etched area 600 formed by partially etching along the bottom side of the torsion bar 334. By controlling the etching process and the area etched, the amount of flex provided by the torsion bar 334 can be carefully controlled within predetermined tolerances. Typically, the remaining partial thickness is about 50% of the original. Optionally, an adhesion pocket 610 is formed by partial etching within the area of the bonding pad 332 in order to provide a trap for excess adhesive and provide a good bonding between the transducer head 152 and the bonding pad 332.

In the embodiment illustrated in FIGS. 5–7, the dimple 340 is formed by a stamping process in which the metal is deformed to the desired shape. The bonding pad 332 is stamped to provide a step 620 downward from the torsion bar to the bonding pad, so that the bottom surface 630 of the bonding pad is appropriately aligned approximately level with the bottommost point 632 of the dimple 340. The height of the stamped step 620 is typically 0.025 mm and this is enough to provide about 2 degrees of pitch and roll static altitude. In an alternative embodiment discussed with reference to FIGS. 12 and 13, as will be discussed further, stamping the bonding pad may be unnecessary.

With reference to FIG. 7, the bending arms 350 and 352 include areas having partial thickness formed by partial etching. Particularly, an area 700 extending along the first bending arm 350 and an area 702 including the second bending arm 352 each has a partial thickness. The partially thick areas 700 and 702 can be formed by a partial etching process performed simultaneously with partially etching the torsion bar area 600 and the adhesive pocket 610. All partially etched regions have the same thickness.

Figure 8:
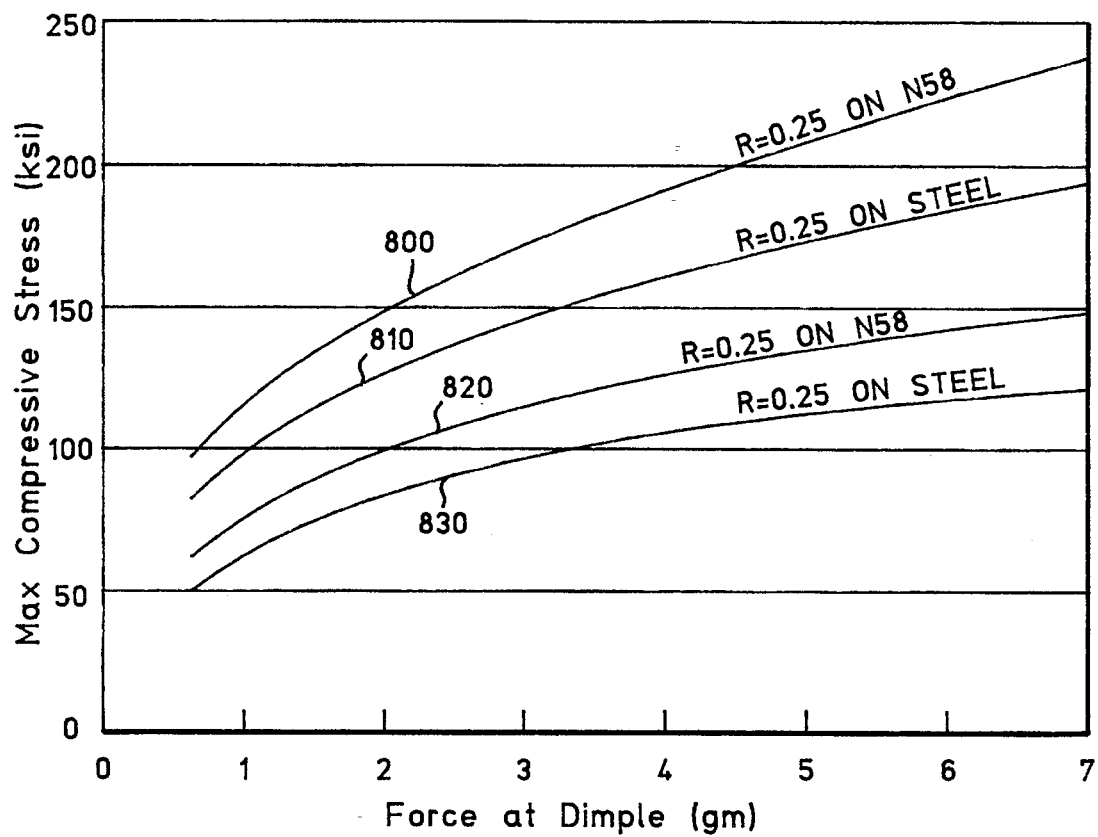
FIG. 8 is a graphical depiction of the compressive contact at the dimple interface for two different radiuses of curvature of a stainless steel dimple, and for a transducer head interfaces, one made of N58 and the other made of steel.

FIG. 8 is a graph of calculated values illustrating the compressive contact stress at the interface between the dimple 340 and the transducer head 152. Particularly, the maximum compressive stress is graphed as a function of the force at the dimple. Four separate curves illustrate the effects of varying the radius of curvature of the dimple on the stress level in the head and the dimple material. The dimple itself is assumed to be made of stainless steel and the head of an intermetalic, such as N58. A first graph line 800 shows the effect on the compressive stress for variations in the force applied to the dimple, tier a dimple radius of 0.25 mm and a steel-to-N58 interface. Graph line 810 illustrates that same stress versus applied forth to the dimple for a radius of 0.25 mm but a steel-to-steel interface. Similarly, a third graph line 820 plots stress versus force for a value of R=0.5 and an N58-to-steel interface, and a fourth graph line 840 graphs those same values, but with a steel-to-steel interface.

Even though a steel-to-N58 interface produces the most stress for this design, this stress is still lower than conventional systems because the dimple force is only a fraction (about 20%) of the total preload and thus, the contact forces between the transducer head and the dimple are relatively small. The rest of the preload force is transmitted through the bonding pad. Reducing the dimple force to about 20% of the preload has further advantages because the stresses that cause pitting and failure are generally shear and tension forces, rather than compressive forces. Particularly, the shear stresses are 33% and tensile stresses are 13% of the compressive stress shown in FIG. 8. Fretting between the transducer head and the dimple is directly proportional to the preload and the surface hardness. Since the slider material is harder than steel it is expected that less wear and less particle generation will result. Furthermore, from a wear point of view, a steel-to-N58 interface has better wearing characteristics.

Figure 9:
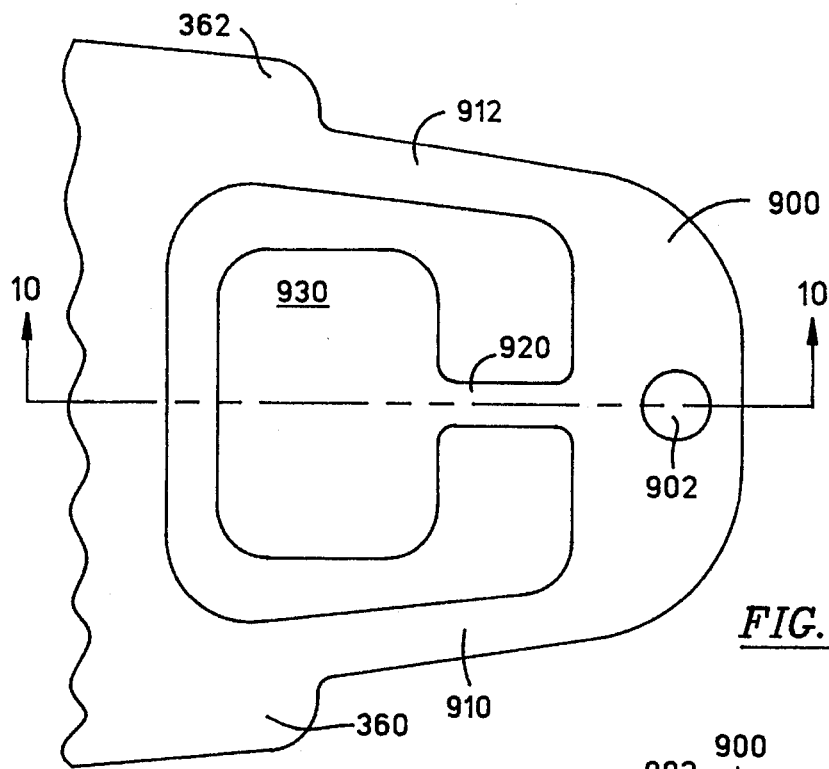
FIG. 9 is a top plan view of an alternative embodiment of an integral flexure.
Figure 10:
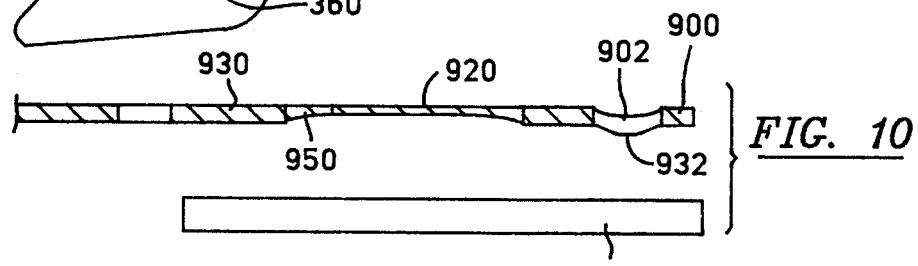
FIG. 10 is a cross-section view of the alternative embodiment of FIG. 9.
Figure 11:
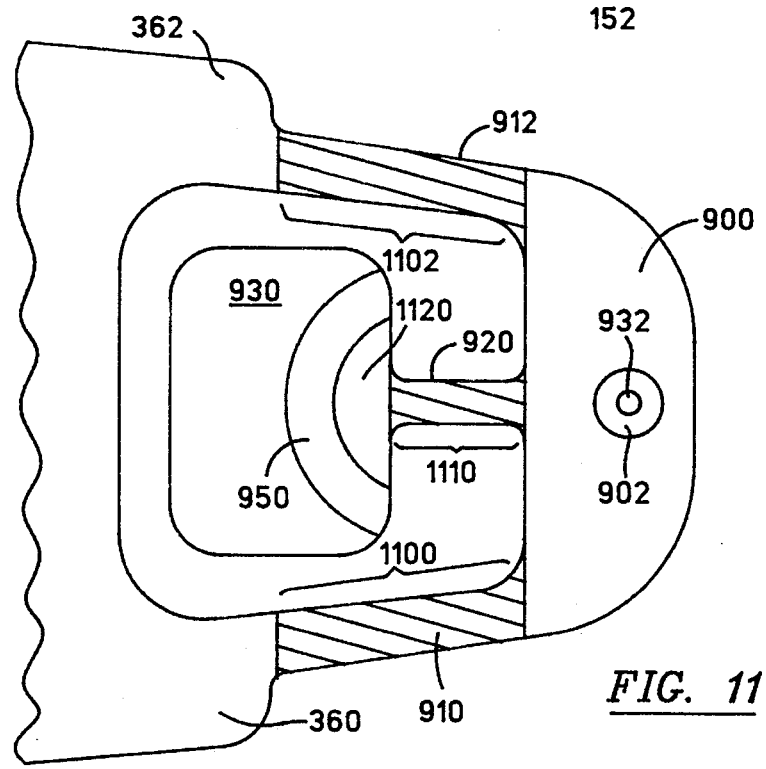
FIG. 11 is a bottom plan view of the alternative embodiment of FIG. 9, illustrating the partially etched regions.

FIGS. 9, 10 and 11 illustrate an alternative embodiment of an integral flexure. FIG. 9 is a top plan view, FIG. 10 is a cross-section along the line in FIG. 9, and FIG. 11 is a bottom plan view. In comparison with the integral flexure illustrated in FIGS. 3 to 7, the bonding pad and floating pad are reversed in position. Particularly, the bonding pad 930 in FIG. 9 is positioned on the leading edge of the slider, which has an advantage in that less flying height variations occur during operation because the bonding pad is located at the leading edge where there is less air bearing pressure buildup, and thus, less sensitivity of flying height to distortions in the air bearing surface (ABS).

With reference to FIGS. 9, 10 and 11, a floating pad 900 is coupled to the load beam extensions 360 and 362 via bending bars. Particularly, a first bending bar 910 couples the floating pad 900 with the first extended section 360 and a second bending bar 912 couples the floating pad 900 with the second extended section 362. The floating pad 900 includes a dimple 902 formed facing downwardly. A torsion bar 920 couples the floating pad 900 with a bonding pad 930. In an assembled suspension arm, the transducer head 152 is bonded to the bonding pad by any suitable adhesive or other means. The transducer head 152 rests on a downwardly facing tip 932 of the dimple 902. Thus, during operation, the transducer 150 is free to pitch and roll as necessary. Particularly, the torsion bar 920 twists to allow the transducer head 150 to pivot about the dimple 902 to allow for rolling movement. To allow pitching movement, the bending bars 910 and 912 allow the transducer head 150 to move accordingly. Yaw movement, which is undesirable, is minimized.

Referring now to FIG. 11, several partially-etched areas, each of which has a partial thickness, are illustrated. Partially etched areas have a remaining thickness of about 50% of the original. Particularly, the first and second bending bars 910 and 912 are etched to a partial thickness in areas 1100 and 1102, respectively, and the torsion bar 920 is also etched to a partial thickness in area 1110 in order to reduce stiffness. A step 950 in the bonding pad 930 is formed preferably by a stamping process in order to align the bottom surface of the bonding pad 930 with the bottom portion 932 of the dimple. The dimple 902 could be stamped simultaneously with the formed step.

Figure 12:
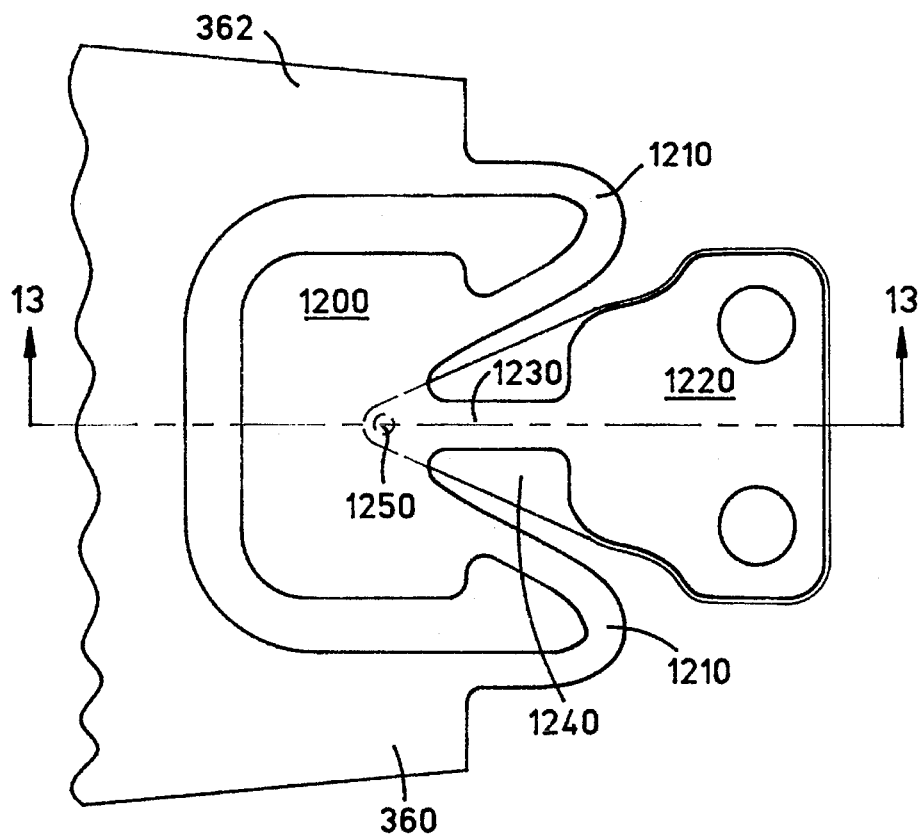
FIG. 12 is still another embodiment of an integral flexure in which a spacer and an etched dimple are utilized.
Figure 13:
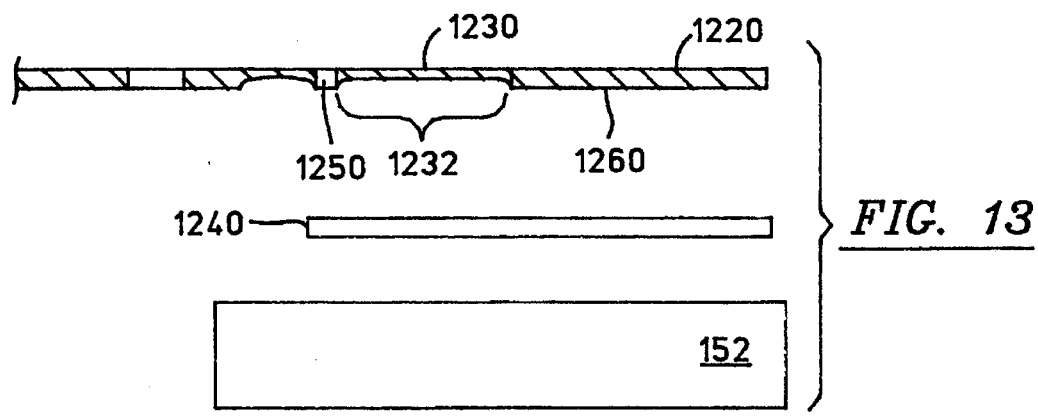
FIG. 13 is a cross-section of the central line of the alternative embodiment of FIG. 12.

FIGS. 12 and 13 illustrate still another embodiment, in which a thin spacer sheet 1240 is positioned between the flexure and slider. Referring first to FIG. 12, a floating pad 1200 is affixed to the main body of the load beam by a pair of bending bars. Particularly, a first U-shaped bending bar 1210 is formed to connect the bonding pad 1200 with a first elongated member 360 from the load beam. A second bending bar 1210 connects the bonding pad 1200 with the second elongated member 362 of the main body of the load beam. A bonding pad 1220 is connected to a torsion bar 1230, which is connected to the floating pad 1200.

Referring both to FIG. 12 and FIG. 13, a spacer bar 1240 having an approximately triangular shape is connected to the bonding pad 1220 by conventional means such as adhesive or weld spots. The floating pad 1200 includes a dimple 1250, partially etched on the bottom facing surface. Advantageously, partial etching avoids the stamping step and therefore does not require stamping the dimple nor forming the bonding pad, because the bottommost portion of the dimple 1250 is already aligned with the bottommost portion 1260 of the bonding pad 1220. The spacer 1240 has approximately a flat even thickness. As with the other embodiments, the torsion bar 1230 includes a partially etched area 1232 having a partial thickness in order to improve its characteristics.

Advantageously, the spacer sheet 1240 avoids dimple-to-slider contact. Furthermore, because the dimple can be etched rather than stamped, this embodiment advantageously avoids the stamping steps required to produce the dimple and level to the bonding pad with the tip of the dimple (as are required with the embodiment of FIGS. 3–7 and the alternate embodiment of FIGS. 9–11). However, the spacer 1240 adds additional thickness and additional steps, and therefore the solid height of this embodiment will be approximately the same as with the previously described embodiments.

Figure 14:
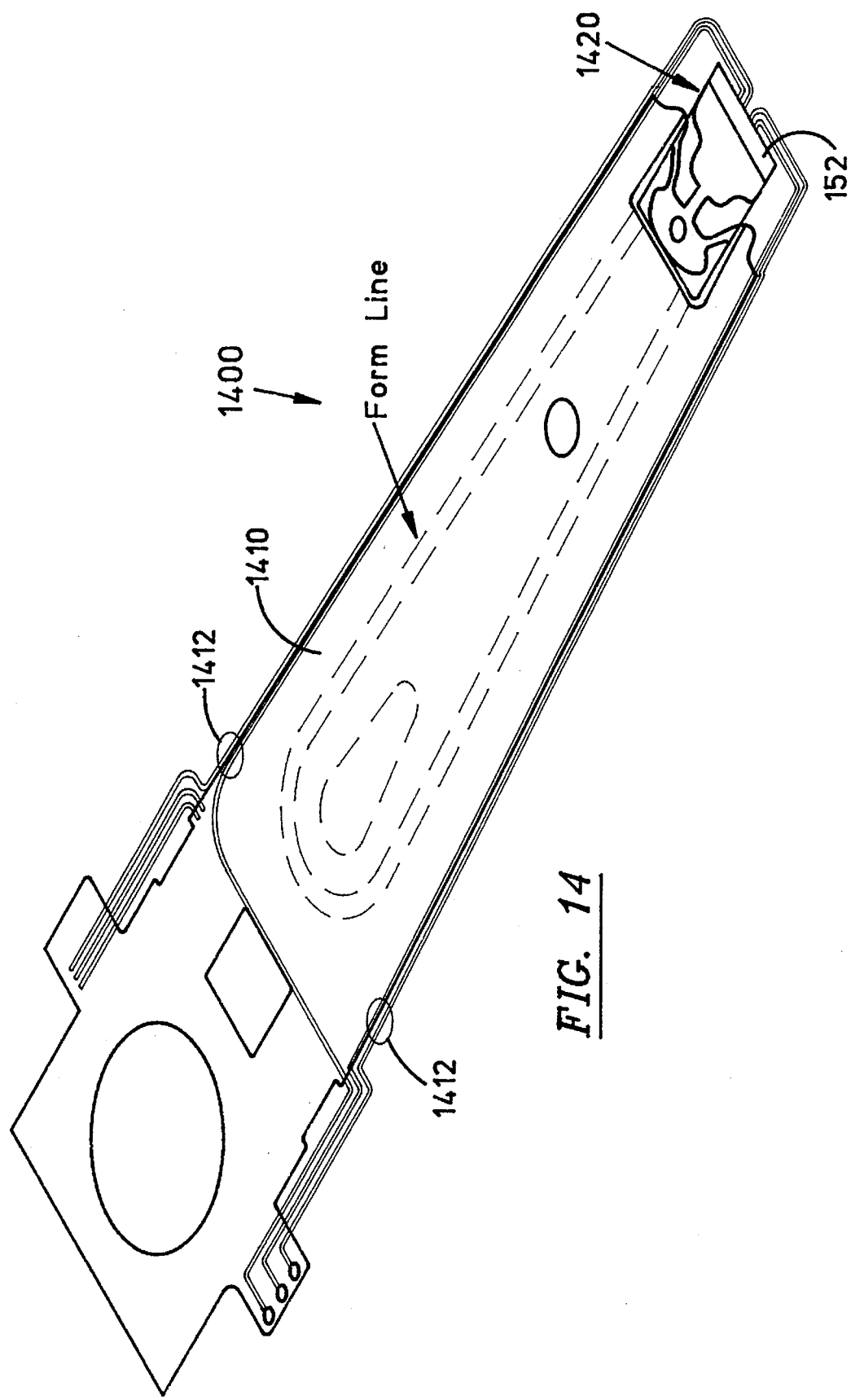
FIG. 14 is a illustration of a load beam having an integral flexure formed from a laminated load beam with integrated wire leads.
Figure 15:
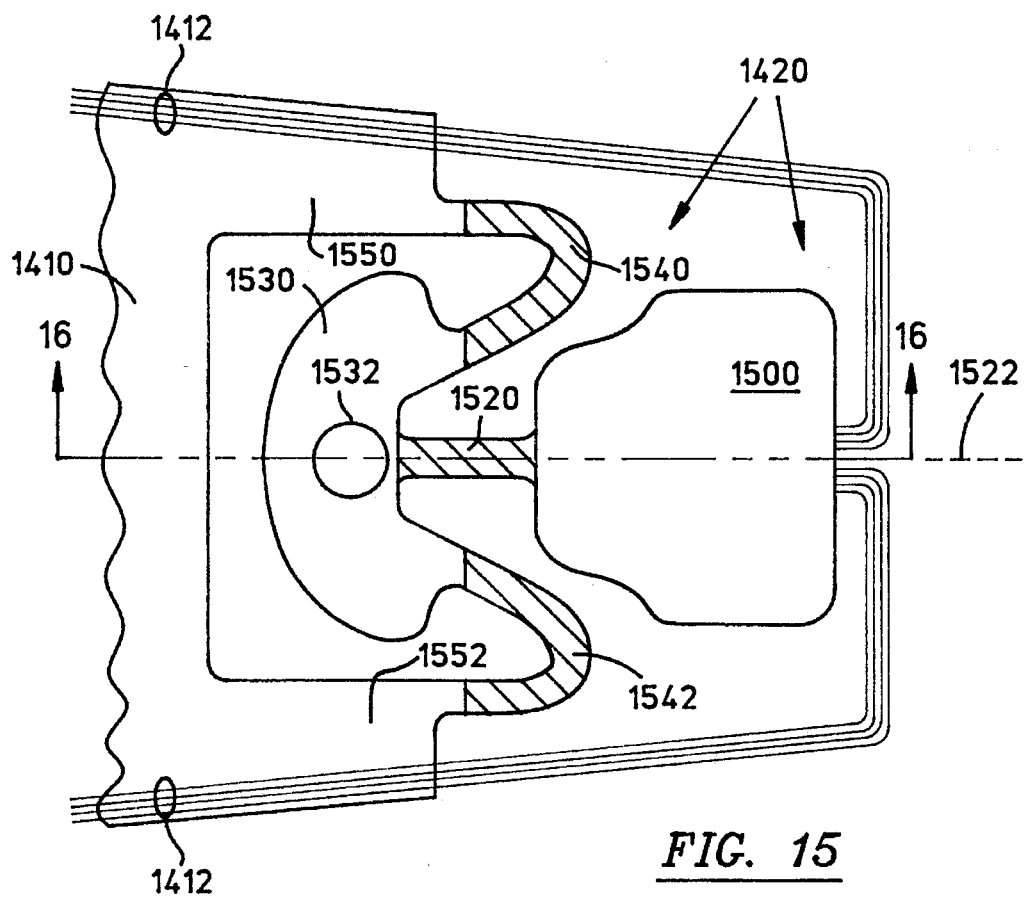
FIG. 15 is a top plan view of the alternative embodiment of FIG. 14 including integrated leads in a laminated assembly.
Figure 16:
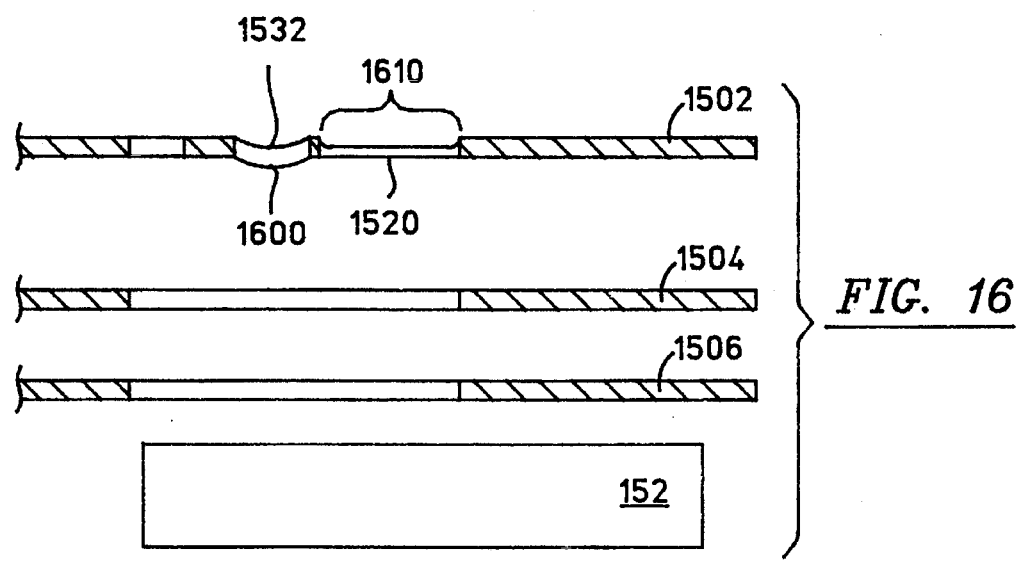
FIG. 16 is a cross-section exploded view of the laminated assembly of FIGS. 14 and 15, also showing a transducer head.

FIGS. 14, 15 and 16 illustrate one embodiment of a load beam having an integral flexure, in which laminated materials are utilized to form the suspension arm 1400. Particularly, a load beam 1410 and an integral flexure 1420 are formed of laminated material. Use of laminated material for constructing slider suspension systems is known in the art. For example, Erpelding et al., U.S. Pat. No. 4,996,623 issued Feb. 26, 1991, which is expressly incorporated by reference herein, discloses a suspension system comprising an intermediate layer of polyamide sandwiched between two metal layers including a top (support) layer and a bottom (conductor) layer. U.S. Pat. No. 5,145,553 by A. A. Albrecht, et al., issued Sep. 8, 1992, discloses one of the metal layers may comprise a conductor such as copper/iron/zinc/beryllium copper. Utilizing this conductor layer, it is known that discrete lead wires for the head assembly in a disk drive can be replaced by integrated leads formed from the conductor layer. For example, the patent to Erpelding et al. cited above discloses a plurality of conductors formed in the copper layer of a suspension arm for providing electrical connections to the slider.

In the intermediate layer, the polyamide operates as a dielectric and therefore, any other electrically insulating material such as teflon or epoxy may be used. The support layer may comprise a ridged material such as stainless steel. The conductor layer may comprise high strength copper utilizing such a laminated structure advantageously simplifies the manufacturing process and reduces the size of the head gimbal assembly.

Referring to FIG. 14, the main body 1410 comprises a plurality of integrated conductors 1412 formed in the conductor layer. As illustrated, the integrated conductors 1412 are formed along both sides of the main body. The integral flexure 1420 is illustrated in more detail with reference to FIGS. 15 and 16. The integrated wires 1412 extend from the load beam and are routed to the transducer head via connections in the bonding pad 1500. Particularly, the bonding pad like the main body comprises a steel support layer 1502, a dielectric layer 1504 and a copper conductor layer 1506. The wires are routed to the appropriate sections in the copper layer 1506 within the bonding pad 1500.

A torsion bar 1520 is connected to the bonding pad 1500. Particularly the torsion bar 1520 extends parallel with a center line 1522 defined extending through the center line of the flexure 1420. The torsion bar 1520 connects the bonding pad 1500 with a floating pad 1530 in which a dimple 1532 is stamped that extends downwardly. A pair of bending arms connect the floating pad 1530 with the main body of the load beam 1410. Particularly a first bending bar 1540 having a U-shape connects the loading pad to a first elongated member 1550 of the load beam, and a second bending bar 1542 having a U-shape connects the floating pad 1530 with a second elongated member 1552 of the load beam.

The exploded view of FIG. 16 illustrates a cross-section of the flexure 1420 in relation to a slider head 152. When assembled, the slider head 152 rests directly upon a bottommost portion 1600 of the dimple 1532. The width of the dielectric layer 1504 and the conductor layer 1506 is sufficient to approximately level the slider with the dimple 1600, and therefore no stamping or other forming of the bonding pad is needed because the dielectric and the copper layers together space the slider head sufficiently from the bonding pad to approximately level it.

The torsion bar 1520 is partially etched in an area 1610 from the top, rather than from the bottom as in other embodiments. The bending arms 1540 and 1542 (see FIG. 15) are also partially etched to a partial thickness from the top. The remaining thickness of the partially etched areas is about 50% of the original thickness.

The integral flexure 1420 has the same basic configurations that are disclosed in FIGS. 3–7, and operates according to similar principles. Particularly the torsion bar 1520 allows the slider to roll about the dimple 1532, and the bending bars 1540 and 1542 allow the slider assembly to pitch as necessary within a predetermined range. Furthermore, yaw, which is undesirable, is minimized.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawings.

I claim:

1. A load beam for a head suspension assembly in a disk drive system, said load beam having an integral flexure for coupling to a transducer head and a main body for coupling to an actuator arm, comprising:

a pair of bending bars including a first bending bar and a second bending bar connected to said main body;

a floating pad connected to said pair of bending bars, said floating pad having a dimple formed therein;

a torsion bar connected to the floating pad; and a bonding pad connected to the torsion bar, said bonding pad for coupling a transducer head thereto.

2. The load beam of claim 1 wherein said load beam defines a central line extending from the base section towards the tip, and said torsion bar is aligned along said center line.

3. The load beam of claim 2 wherein said torsion bar has a partial thickness.

4. The load beam of claim 1 wherein a pitch axis is defined perpendicular to said center line and in the plane of said load beam, and said bending bars have a U-shape to substantially allow bending about said pitch axis.

5. The load beam of claim 4 wherein said first and second bending bars have a partial thickness.

6. The load beam of claim 1 wherein said dimple defines a bottommost point on its lower surface and said bonding pad has a lower planar surface approximately aligned with said bottommost point.

7. The load beam of claim 6 wherein said lower planar surface has an adhesion pocket defined therein.

8. The load beam of claim 1 wherein said main body comprises a first elongated member connected to said first bending bar and a second elongated member connected to said second bending bar.

9. A load beam for a head suspension assembly in a disk drive system, said load beam having an integral flexure for coupling to a transducer head and a main body for coupling to an actuator arm, comprising:

a pair of bending bars including a first U-shaped bending bar and a second U-shaped bending bar connected to said main body;

a floating pad connected to said pair of bending bars, said floating pad having a dimple formed therein;

a bonding pad connected to the torsion bar, said bonding pad having a lower surface for coupling a transducer head thereto; and a torsion bar connecting the floating pad to the bonding pad, so that when a transducer head is coupled to said bonding pad, a portion of said transducer head rests against said dimple on said floating pad to provide movement about said dimple.

10. The load beam of claim 9 wherein said lower surface of said bonding pad has a substantially planar surface for coupling to said transducer head, said surface being approximately aligned with a bottommost point defined on the lower surface of said dimple, so that when said transducer head is coupled to said lower surface and rests upon said dimple, said transducer head has freedom to pitch and roll.

11. A load beam of claim 9 wherein the transducer head when coupled to said integral flexure defines a roll axis and said torsion bar is substantially aligned with said roll axis.

12. The load beam of claim 9 wherein said bonding pad a lower surface is planar and has an adhesion pocket defined therein.

13. The load beam of claim 9 wherein said main body comprises a first elongated member connected to said first bending bar and a second elongated member coupled to said bending bar.

14. The load beam of claim 9 wherein said each of said bending bars includes an area of partial thickness, and said torsion bar includes an area of a partial thickness.

15. A load beam for a head suspension assembly in a disk drive system, said load beam having an integral flexure for coupling to a transducer head and a substantially planar main body for supporting said integral flexure, comprising:

a first elongated member and a second elongated member extending from said main body;

a pair of U-shaped bending bars including a first bending bar connected to said first elongated member and a second bending bar connected to said second elongated member each bending bar including a partially-etched section having a partial thickness;

a floating pad connected to said pair of bending bars and positioned between said first and second elongated member, said floating pad having a downwardly extending dimple defining a lowermost point for contacting said transducer head;

a torsion bar extending from the floating pad approximately centered between said first and second bending bars, said torsion bar having a partially-etched section having a partial thickness; and a bonding pad connected to the torsion bar, said bonding pad having a lower surface coupled to said transducer head.

16. The load beam of claim 15 wherein said lower surface of said bonding pad has a substantially planar surface for coupling to said transducer head, said surface being approximately aligned with a bottommost point defined by said dimple, so that when said transducer head is coupled to said lower surface and rests upon said dimple, said dimple provides preload and said transducer head has freedom to pitch and roll.

17. A head suspension assembly system for a disk drive system, comprising:

a transducer head;

a load beam coupled to the transducer head, said load beam having an integral flexure for coupling to the transducer head and a main body for coupling to an actuator arm, said flexure comprising a pair of bending bars including a first bending bar and a second bending bar connected to said main body, a floating pad connected to said pair of bending bars, said floating pad including a dimple extending downwardly to contact said transducer head, a torsion bar connected to the floating pad, and a bonding pad connected to the torsion bar, said bonding pad having a lower surface coupled to said transducer head.

18. The load beam of claim 17 wherein said load beam defines a central line extending from the base section towards the tip, and said torsion bar is aligned along said center line.

19. An actuator assembly for mounting on an actuator shaft of a disk drive unit, including:

a comb unit having a plurality of actuator arms and a hub assembly for coupling to the actuator shaft; and a plurality of head suspension assemblies each coupled to one of said plurality of actuator arms, each head suspension assembly comprising a transducer head and a load beam having a first end coupled to the transducer head and a second end coupled to an actuator arm, said load beam having an integral flexure for coupling to a transducer head and a main body for coupling to one of said actuator arms, comprising a pair of bending bars including a first bending bar and a second bending bar connected to said main body, a floating pad connected to said pair of bending bars, said floating pad including a dimple extending downwardly to contact said transducer head, a torsion bar connected to the floating pad, and a bonding pad connected to the torsion bar, said bonding pad having a lower surface coupled to said transducer head.

20. The load beam of claim 19 wherein said load beam defines a central line extending from the base section towards the tip, and said torsion bar is aligned along said center line.

21. A disk drive unit comprising:

a master controller unit;

a spindle drive controller coupled to the master controller unit;

a plurality of stacked magnetic disks electrically coupled to the spindle drive controller;

a transducer head electrically coupled to the master controller unit;

an actuator drive controller coupled to the master controller unit;

an actuator shaft coupled to the actuator drive controller; and an actuator assembly coupled to the actuator shaft, comprising:

a comb unit having a plurality of actuator arms and a hub assembly for coupling to the actuator shaft; and a plurality of head suspension assemblies each coupled to one of said plurality of actuator arms, each head suspension assembly comprising a transducer head, and a load beam having a first end coupled to the transducer head and a second end coupled to an actuator arm, said load beam having an integral flexure for coupling to a transducer head and a main body for coupling to one of said actuator arms, comprising a pair of bending bars including a first bending bar and a second bending bar connected to said main body, a floating pad connected to said pair of bending bars, said floating pad having a dimple extending downwardly to contact said transducer head, a torsion bar connected to the floating pad, and a bonding pad connected to the torsion bar, said bonding pad having a lower surface coupled to said transducer head.

22. The load beam of claim 21 wherein said load beam defines a central line extending from the base section towards the tip, and said torsion bar is aligned along said center line.

* * * * *